UNITED STATES PATENT OFFICE.

DANIEL W. DAKE, OF BROOKLYN, NEW YORK.

IMPROVED METHOD OF PREPARING COLORING MATTER FOR BUTTER.

Specification forming part of Letters Patent No. 59,975, dated November 27, 1866.

*To all whom it may concern:*

Be it known that I, DANIEL W. DAKE, of Brooklyn, in the county of Kings and State of New York, have invented a new and useful Process for Preparing a Coloring Matter for Butter; and I do hereby declare that the following is a full, clear, and exact description thereof, which will enable others skilled in the art to understand and practice the same.

The coloring matter prepared according to my invention consists of the pure oil of butter and the coloring matter of anotta, without the admixture of any other ingredients.

To prepare it, I take a quantity of fresh butter, say one hundred pounds, and melt it in a tin bath-kettle, set in boiling water, or subjected to the heat of steam. The curd and whey will be deposited at the bottom, leaving about seventy-five per cent. of the pure oil of butter, which I pour off into another similar kettle, being careful not to pour out any of the sediment; in which last-mentioned kettle I heat the oil to as high a degree of temperature as will be produced by setting the kettle in boiling water. I then put into a tub prepared for the purpose, as hereinafter described, anotta, either in the form in which it is usually sold in the market, put up in baskets, or in its natural seed form, in the proportion of five pounds of anotta for every one hundred pounds of butter melted as aforesaid, or seventy-five pounds of the pure oil. I then pour the heated oil of butter into the tub, upon the anotta, and stir the anotta until the coloring matter is extracted and combined with the oil, which, if the stirring be effectual, will take from half to three-quarters of an hour.

The stirring must be done by some means which will cut or tear the mass of anotta (which is of a tough, glutinous, or gummy consistence) to pieces; and for this purpose I prepare the tub as follows: I set in the bottom of the tub three or more concentric rows of pins, standing up vertically about two inches. I then make a false bottom or follower, with similar concentric rows of pins projecting from its lower side, but so arranged that the pins in the follower will pass between the rows of pins in the bottom. The anotta being placed in the tub, the false bottom or follower is then put in upon it, and the heated oil of butter poured in upon the follower. The follower is then rotated or oscillated by means of a crank or handles, or any other suitable mechanical contrivance, and the pins in the follower, passing between the pins in the bottom, will sufficiently cut or tear the anotta to cause the coloring matter to be soon extracted therefrom. The oil, with the coloring matter of the anotta thus thoroughly combined with it, is then poured off, leaving the solid portion of the anotta in a gummy state in the tub.

The oil thus poured off will be of a beautiful reddish golden color, and perfectly transparent, and ready for use in coloring butter, or for putting up in bottles or other vessels for the market.

From one to two pounds of this coloring matter will be sufficient for one hundred pounds of butter, depending somewhat upon the natural color of the butter. It must be thoroughly worked in with the butter if applied after churning; or it may be mixed with the cream before churning.

I do not limit myself to the particular means herein described for stirring the anotta to extract the coloring matter, as any other means by which it will in like manner be cut and torn will answer equally well. The coloring matter thus produced will impart no bad flavor or deleterious quality to the butter.

I am aware that the coloring matter of anotta has heretofore been used for coloring butter; but when so used it has been treated with alkalies, which, when brought into contact with the butter, produce soap, and impart a bad taste to the butter.

What I claim as my invention, and desire to secure by Letters Patent, is—

1. The method or process herein described of preparing a coloring matter for butter, consisting of pure oil of butter and the coloring matter of anotta, combined as herein described.

2. As a new composition of matter for coloring butter, pure oil of butter and the coloring matter of anotta, prepared and combined substantially as described.

DANIEL W. DAKE.

Witnesses:
J. J. COOMBS,
R. WHITE.